US010423468B2

(12) United States Patent
Doyle et al.

(10) Patent No.: US 10,423,468 B2
(45) Date of Patent: Sep. 24, 2019

(54) COMPLEX EVENT PROCESSING USING PSEUDO-CLOCK

(71) Applicant: Red Hat, Inc., Raleigh, NC (US)

(72) Inventors: Duncan Doyle, Amsterdam (NL); Edson Tirelli, Etobicoke (CA)

(73) Assignee: Red Hat, Inc., Raleigh, NC (US)

( * ) Notice: Subject to any disclaimer, the term of this patent is extended or adjusted under 35 U.S.C. 154(b) by 174 days.

(21) Appl. No.: 14/618,257

(22) Filed: Feb. 10, 2015

(65) Prior Publication Data
US 2016/0231769 A1 Aug. 11, 2016

(51) Int. Cl.
*G06F 1/04* (2006.01)
*G06F 9/54* (2006.01)
*G06F 9/52* (2006.01)
*G06F 1/14* (2006.01)

(52) U.S. Cl.
CPC ............... *G06F 9/542* (2013.01); *G06F 9/52* (2013.01); *G06F 1/14* (2013.01)

(58) Field of Classification Search
CPC .......... G06F 1/14; G06F 9/4825; G06F 9/542; G06F 9/52; G06G 1/08
USPC ........................................................ 713/502
See application file for complete search history.

(56) References Cited

U.S. PATENT DOCUMENTS

| | | | | |
|---|---|---|---|---|
| 5,475,681 A | * | 12/1995 | White | G06F 13/423 370/346 |
| 5,517,505 A | * | 5/1996 | Buchholz | G06F 13/423 370/349 |
| 5,691,917 A | * | 11/1997 | Harrison | H04L 41/064 717/127 |
| 6,092,118 A | * | 7/2000 | Tsang | G06F 9/54 709/207 |
| 6,324,495 B1 | * | 11/2001 | Steinman | G06F 17/5009 703/13 |
| 6,714,611 B1 | * | 3/2004 | Du | H04W 56/0035 375/356 |
| 6,751,228 B1 | * | 6/2004 | Okamura | H04J 3/0632 370/412 |

(Continued)

FOREIGN PATENT DOCUMENTS

| | | |
|---|---|---|
| EP | 2736002 | 5/2014 |
| WO | 2014118132 | 8/2014 |

OTHER PUBLICATIONS

Eckert, Michael, "Complex Event Processing with XChangeEQ: Language Design, Formal Semantics, and Incremental Evaluation for Querying Events", Lidwig-Maximilians Universitat, Munchen, Oct. 22, 2008, pp. 1-275 http://www.en.pms.almu.de/publications/dissertationen/Michael.Eckert/DISS_Michael.Eckert.pdf.

(Continued)

*Primary Examiner* — Volvick Derose
(74) *Attorney, Agent, or Firm* — Lowenstein Sandler LLP

(57) ABSTRACT

Systems and methods for complex event processing. An example method may comprise: receiving, by a processing device of a first event processing node, an event data item reflecting a change of a system state, the event data item comprising a unique event identifier and a timestamp; and, responsive to determining a difference between the timestamp and a value of a pseudo-clock associated with the first event processing node, synchronizing the state of the first event processing node with the state of a second event processing node by adjusting the pseudo-clock by the difference.

13 Claims, 5 Drawing Sheets

(56) References Cited

U.S. PATENT DOCUMENTS

| | | | |
|---|---|---|---|
| 6,810,405 B1* | 10/2004 | LaRue | A61M 19/00 707/613 |
| 6,993,246 B1* | 1/2006 | Pan | G11B 27/10 386/201 |
| 7,818,370 B2 | 10/2010 | Piper et al. | |
| 8,214,795 B2 | 7/2012 | Cheriton | |
| 8,543,534 B2 | 9/2013 | Alves et al. | |
| 8,560,889 B2 | 10/2013 | Behrendt et al. | |
| 8,688,404 B1* | 4/2014 | Levy | G06F 1/14 375/354 |
| 8,756,049 B2 | 6/2014 | Proctor | |
| 8,775,389 B2 | 7/2014 | Arcushin et al. | |
| 8,825,848 B1* | 9/2014 | Dotan | G06F 17/30144 709/223 |
| 9,012,853 B2* | 4/2015 | Gueorguiev | G01T 1/172 250/362 |
| 9,100,135 B2* | 8/2015 | Tosti | H04J 3/0667 |
| 9,380,068 B2* | 6/2016 | Iyer | H04L 63/1416 |
| 2002/0065940 A1* | 5/2002 | Suzuki | H04J 3/0664 709/248 |
| 2002/0131398 A1* | 9/2002 | Taylor | H04J 3/0632 370/350 |
| 2003/0040955 A1 | 2/2003 | Anaya et al. | |
| 2003/0177154 A1* | 9/2003 | Vrancic | G06F 1/12 708/160 |
| 2004/0114607 A1* | 6/2004 | Shay | H04J 3/0664 370/395.42 |
| 2004/0249856 A1* | 12/2004 | Garden | G06F 17/30306 |
| 2005/0044351 A1* | 2/2005 | Harvey | H04L 9/3297 713/153 |
| 2005/0169233 A1* | 8/2005 | Kandala | H04B 1/7183 370/349 |
| 2005/0182856 A1* | 8/2005 | McKnett | G06F 1/14 709/248 |
| 2005/0192846 A1* | 9/2005 | De Zwart | G06F 19/322 705/3 |
| 2006/0036722 A1* | 2/2006 | Larkin | H04L 41/024 709/223 |
| 2006/0101130 A1 | 5/2006 | Adams | |
| 2006/0101447 A1* | 5/2006 | Koch | G06F 17/30578 717/168 |
| 2006/0150246 A1 | 7/2006 | Kamada | |
| 2006/0218535 A1* | 9/2006 | Delmonte | G06F 11/3457 717/127 |
| 2007/0168990 A1 | 7/2007 | Alshab et al. | |
| 2008/0086489 A1* | 4/2008 | Wilkes | G06Q 10/06 |
| 2008/0125146 A1* | 5/2008 | Bainbridge | H04W 88/184 455/466 |
| 2008/0196006 A1* | 8/2008 | Bates | G06F 9/542 717/109 |
| 2008/0209078 A1* | 8/2008 | Bates | G06Q 10/00 710/10 |
| 2008/0243463 A1* | 10/2008 | Lovas | G06Q 10/04 703/17 |
| 2009/0158075 A1* | 6/2009 | Biberstein | G06F 1/12 713/375 |
| 2009/0217050 A1 | 8/2009 | Amiel et al. | |
| 2009/0225676 A1 | 9/2009 | Kisela et al. | |
| 2010/0034539 A1* | 2/2010 | Ko | H04B 7/2693 398/98 |
| 2010/0042573 A1* | 2/2010 | Wenig | G06F 9/54 706/47 |
| 2010/0100520 A1* | 4/2010 | Dargue | G09B 9/08 706/47 |
| 2010/0169695 A1* | 7/2010 | Jurgilewicz | G06F 1/26 713/400 |
| 2010/0175076 A1* | 7/2010 | Acedo | G06F 9/547 719/328 |
| 2010/0177763 A1* | 7/2010 | Van Der Stok | H04J 3/0638 370/350 |
| 2010/0235879 A1* | 9/2010 | Burnside | H04L 63/0263 726/1 |
| 2011/0006818 A1* | 1/2011 | Takagi | H03L 7/085 327/147 |
| 2011/0040708 A1* | 2/2011 | Tirelli | G06N 5/047 706/12 |
| 2011/0040709 A1 | 2/2011 | Proctor et al. | |
| 2011/0078288 A1 | 3/2011 | Chen | |
| 2011/0202496 A1* | 8/2011 | Klinger | G06N 5/04 706/60 |
| 2011/0228834 A1* | 9/2011 | Umayabashi | H03L 7/08 375/224 |
| 2011/0246223 A1* | 10/2011 | Rundensteiner | G06Q 10/06 705/2 |
| 2012/0010857 A1* | 1/2012 | Richter | G01R 31/31907 702/187 |
| 2012/0016831 A1* | 1/2012 | Proctor | G06N 5/025 706/47 |
| 2012/0030495 A1* | 2/2012 | Chandhoke | G06F 1/10 713/400 |
| 2012/0089991 A1* | 4/2012 | Scheerer | G06F 11/3632 719/318 |
| 2012/0102362 A1 | 4/2012 | Onitsuka et al. | |
| 2012/0148248 A1* | 6/2012 | Li | H04J 3/065 398/58 |
| 2012/0219099 A1* | 8/2012 | Loukianov | G06F 1/14 375/357 |
| 2012/0246653 A1* | 9/2012 | Boruhovski | G06F 9/541 718/102 |
| 2012/0257626 A1 | 10/2012 | McGhee et al. | |
| 2012/0265903 A1 | 10/2012 | Peled | |
| 2012/0310850 A1* | 12/2012 | Zeng | G06N 5/02 705/317 |
| 2012/0311562 A1* | 12/2012 | Wang | H04L 67/34 717/177 |
| 2012/0331352 A1* | 12/2012 | Guenther | G05B 19/0426 714/38.1 |
| 2013/0005449 A1* | 1/2013 | Ly | G06F 11/2038 463/26 |
| 2013/0019121 A1* | 1/2013 | Ben-David | G06F 1/12 713/600 |
| 2013/0024567 A1* | 1/2013 | Roxburgh | G06F 11/3006 709/224 |
| 2013/0031112 A1* | 1/2013 | Gunn | G06F 17/30221 707/755 |
| 2013/0036419 A1* | 2/2013 | Hazelet | G06Q 10/00 718/100 |
| 2013/0046725 A1 | 2/2013 | Cammert et al. | |
| 2013/0085993 A1 | 4/2013 | Li et al. | |
| 2013/0266127 A1* | 10/2013 | Schachter | G10L 25/48 379/88.01 |
| 2014/0021356 A1* | 1/2014 | Zwaans | G01T 1/2985 250/362 |
| 2014/0095535 A1 | 4/2014 | Deshmuch et al. | |
| 2014/0219269 A1* | 8/2014 | Vleugels | G06F 5/16 370/350 |
| 2014/0280861 A1 | 9/2014 | Anderson et al. | |
| 2014/0297800 A1 | 10/2014 | Mutschler et al. | |
| 2014/0334582 A1* | 11/2014 | Bock | G06F 1/12 375/356 |
| 2014/0365551 A1* | 12/2014 | Mutschler | H04L 67/12 709/201 |
| 2015/0012667 A1* | 1/2015 | Carlson | G06F 9/546 709/248 |
| 2015/0163048 A1* | 6/2015 | Turnbull | H04J 3/16 370/508 |
| 2015/0237464 A1* | 8/2015 | Shumaker | H04L 51/20 709/204 |
| 2015/0317567 A1* | 11/2015 | Lin | G06Q 10/00 705/7.11 |
| 2015/0363245 A1* | 12/2015 | Mutschler | G06F 9/542 719/318 |
| 2016/0033990 A1* | 2/2016 | Luciani | G06F 1/14 713/502 |
| 2016/0173347 A1* | 6/2016 | Rajapakse | H04L 43/06 709/224 |

(56) References Cited

U.S. PATENT DOCUMENTS

2016/0224659 A1* 8/2016 Robichaud .......... G06F 3/04842
2017/0017676 A1* 1/2017 Levy ................. G06F 17/30516

OTHER PUBLICATIONS

"Oracle Fusion Middleware Administrator's Guide for Oracle Complex Event Processing", Oracle, 11g Release 1 E14300-10, Aug. 2012, Parts 1-IV https://docs.oracle.com/cd/E23943_01/admin.1111/e14300.pdf.

USPTO, Office Action for U.S. Appl. No. 14/618,262, dated Feb. 11, 2016.

Mollenkopf, Adam et al. "Applying Drools Fusion Complex Event Processing (CEP) for Real-Time Intelligence", JBossWorld 2009, FedEx Custom Critical, Sep. 2, 2009, 38 Pages https://www.redhat.com/f/pdf/jbw/amollenkopf_430_applying_drools.pdf.

Tirelli, Edson, "Event Stream Processing, Complex Event Processing and Rules Engines", Drools & jBPM, May 6, 2007, 7 Pages http://blog.athico.com/2007/05/event-stream-processing-complex-event.html.

"Chapter 8. Complex Event Processing", jboss.org, Nov. 17, 2014, pp. 1-26 http://docs.jboss.org/drools/release/6.0.1.Final/drools-docs/html/DroolsComplexEventProcessingChapter.html.

"BRMS Complex Event Processisng Guide", Red Hat, Inc., Nov. 2014, pp. 1-24 https://access.redhat.com/documentation/en-US/JBoss_Enterprise_BRMS_Platform/5/html-single/BRMS_Complex_Event_Processing_Guide/index.html.

Doyle, Duncan and Tirelli, Edson, "Indempotent Mode of Executing Commands Triggered by Complex Event Processing", U.S. Appl. No. 14/618,262, filed Feb. 10, 2015.

USPTO, Final Office Action for U.S. Appl. No. 14/618,262, dated Jul. 15, 2016.

USPTO, Advisory Action for U.S. Appl. No. 14/618,262, dated Sep. 23, 2016.

USPTO, Office Action for U.S. Appl. No. 14/618,262, dated Dec. 21, 2016, 13 pages.

USPTO, Final Office Action for U.S. Appl. No. 14/618,262, dated Jun. 2, 2017, 27 pages.

Malensek, M., et al., "Expressive Query Support for Multidimensional Data in Distributed Hash Tables," ACM Fifth International Conference on Utility and Cloud Computing, IEEE Computer Society, pp. 31-38, 2012.

* cited by examiner

```
rule "Baggage lost at sorting"
when
    $b1:BagScannedEvent( location == Location.CHECK_IN )
    not BagScannedEvent( bagTag == $b1.bagTag, location == Location.SORTING, this after[0s,10m] $b1 )
then
    System.out.println("Baggage lost at sorting");
end
```

FIG. 2

```
long advanceTime = fact.getTimestamp() - pseudoClock.getCurrentTime();
if (advanceTime > 0){
    pseudoClock.advanceTime(advanceTime, TimeUnit.MILLISECONDS);
}
```

FIG. 3

COMPLEX EVENT PROCESSING USING PSEUDO-CLOCK

TECHNICAL FIELD

The present disclosure is generally related to computer systems, and is more specifically related to systems and methods for complex event processing using a pseudo-clock.

BACKGROUND

"Complex event processing" herein shall refer to detecting, correlating, abstracting, aggregating, and/or reacting to certain events by an event processing system. In an illustrative example, an event processing system may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 illustrates an example of an event processing rule 200 to be applied by an event processing node, in accordance with one or more aspects of the present disclosure;

FIG. 3 reproduces a pseudo-code illustrating the method of adjusting the pseudo-clock of an event processing node based on the timestamps of the incoming event data items, in accordance with one or more aspects of the present disclosure;

DETAILED DESCRIPTION

Figure 1:
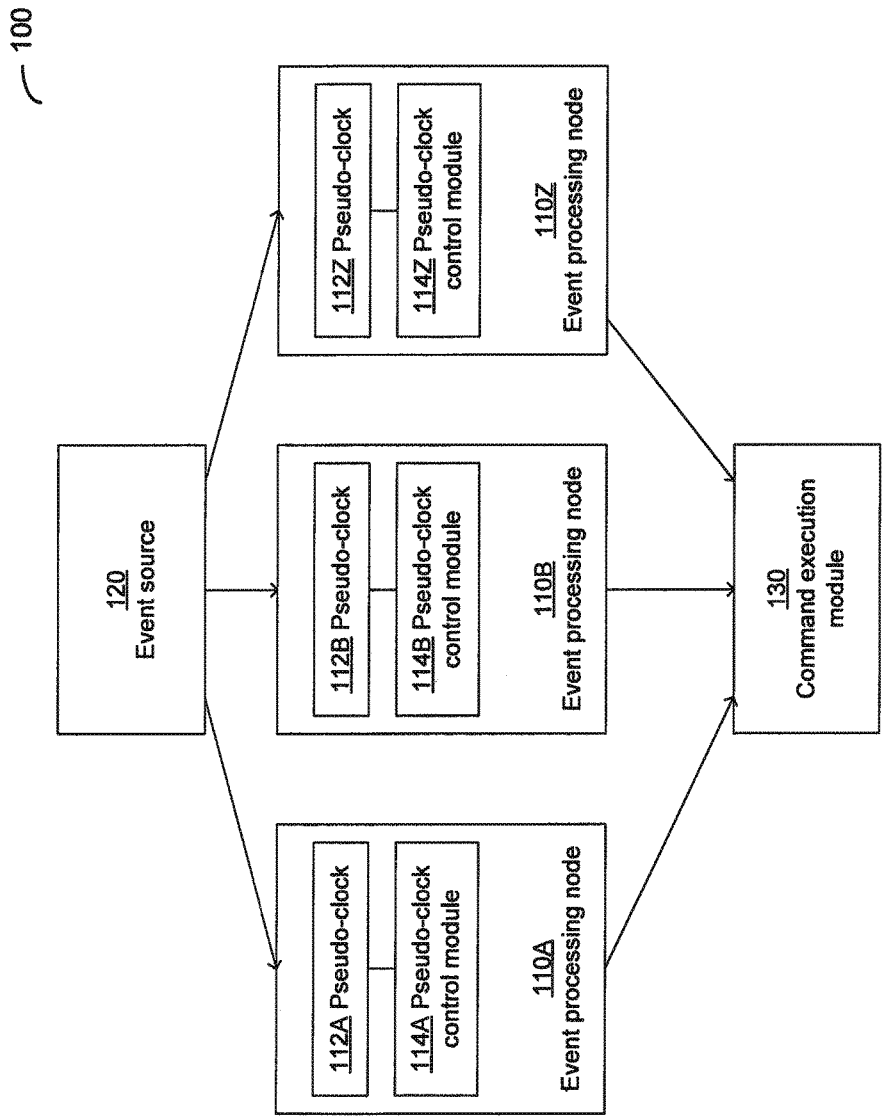
FIG. 1 depicts a high-level component diagram of an illustrative example of an event processing system 100 in accordance with one or more aspects of the present disclosure.

Described herein are methods and systems for complex event processing using a pseudo-clock.

"Event" herein shall refer to an observable change of the state of a certain system at a particular point in time. In an illustrative example, an event may be represented by a luggage item arriving at the luggage sorting facility. In another illustrative example, an event may be represented by a printer going off-line. "Event data item" herein shall represent a data item reflecting a certain event. In certain implementations, an event data item may comprise a unique event identifier, an event timestamp, and values of one or more state variables.

"Complex event processing" herein shall refer to detecting, correlating, abstracting, aggregating, and/or reacting to certain events by an event processing system. In an illustrative example, an event processing system may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules. In an illustrative example, if a luggage item was scanned at the airport check-in desk and then was not, within a pre-defined period of time, scanned at the luggage sorting facility, a notification of the lost item should be displayed.

In certain implementations, an event processing system may comprise a plurality of event processing nodes configured to provide high availability (e.g., node failover) and/or load balancing among the nodes. "High availability" herein shall refer to a system design approach and associated system implementation that ensures a pre-defined level of operational performance of the system.

In an illustrative example, two or more nodes of the event processing system may receive the same stream of event data items. Event processing may involve evaluating certain event processing rules against one or more event data items and performing one or more commands defined by the event processing rules. Since certain aspects of event processing may be dependent on the real-time value (as returned by the real-time clock of the respective event processing node), the real time-clocks of the event processing nodes may need to be synchronized between themselves and/or with the real-time clock that was employed to timestamp event data items at the source. However, the event processing nodes are not necessarily in direct communication with each other and/or with a reliable time source, which may impede the real-time clock synchronization.

Aspects of the present disclosure address the above noted and other deficiencies by introducing, at each event processing node, a pseudo-clock that is employed as the real-time clock for performing event processing tasks. The pseudo-clock may be adjusted based on the timestamps of the incoming event data items. In an illustrative example, responsive to receiving each incoming event data item, the event processing node may determine whether the value of the event timestamp equals the value of the pseudo-clock, and if the two time values are different, adjust the pseudo-clock by the difference value, thus synchronizing its state with the state of other event processing nodes of the event processing system.

Various aspects of the above referenced methods and systems are described in details herein below by way of examples, rather than by way of limitation.

FIG. 1 depicts a high-level component diagram of an illustrative example of an event processing system 100 in accordance with one or more aspects of the present disclosure. Event processing system 100 may comprise a plurality of event processing nodes 110A-110Z. In certain implementations, an event processing node 110 may be represented by one or more computer systems running one or more event processing software modules. Alternatively, an event processing node may be represented by a virtual machine running one or more event processing software modules.

Event processing node 110 may be configured to receive event data items from the event source 120. Event source 120 may be represented, e.g., by one or more data sources, such as a messaging system, a database, a web service, a network socket, etc. In certain implementations, an event data item may comprise a unique event identifier, an event timestamp, and values of one or more state variables.

Event processing node 110 may be configured to process the received event data items. In an illustrative example, event processing node 110 may select certain events from one or more event input streams, correlate certain events based on temporal and/or non-temporal factors (e.g., event timestamps and/or state variable values), compose complex events from certain atomic events, evaluate certain event processing rules against the complex events, and perform certain actions defined by the event processing rules.

In various illustrative examples, an event processing rule may comprise a conditional statements associated with an action to be conditionally performed responsive to evaluating the conditional statement. The conditional statement may comprise values of one or more state variables, which may be comprised by one or more event data items.

FIG. 2 illustrates an example of an event processing rule 200 to be applied by an event processing node, in accordance with one or more aspects of the present disclosure. In the illustrative example of FIG. 2, if a luggage item was scanned at the airport check-in desk and then was not, within a pre-defined period of time, scanned at the sorting facility, a notification of the lost item is displayed on the system console.

In certain implementations, an event processing rule may define an action to be performed in the form of one or more commands. A command may comprise a unique identifier which may be derived from the identifiers of one or more event processing rules that have produced the command and/or identifiers of one or more events that were processed by those event processing rules to produce the command. A command may further comprise a definition of an action to be performed (e.g., an identifier of a software module to be invoked and values of one or more parameters to be passed to the software module).

Referring again to FIG. 1, event processing system 100 may comprise one or more command execution modules 130 that may be configured to execute the commands produced by event processing nodes 110A-110Z.

In accordance with one or more aspects of the present disclosure, event processing node 110 may include a pseudo-clock 112 and a corresponding pseudo-clock control module 114 which may be configured to adjust the pseudo-clock based on the timestamps of the incoming event data items, as described in details herein below.

FIG. 3 reproduces a pseudo-code illustrating the method of adjusting the pseudo-clock of an event processing node based on the timestamps of the incoming event data items, in accordance with one or more aspects of the present disclosure. As schematically illustrated by FIG. 3, responsive to receiving an incoming even data item, pseudo-clock control module 114 may determine whether the value of the event timestamp equals the value of pseudo-clock 112, and if the two time values are different, adjust pseudo-clock 112 by the difference value.

In certain implementations, employing the adjustable pseudo-clock allows synchronizing the states of two or more event processing nodes without establishing a communication link between the nodes for synchronizing the real-time clocks. In an illustrative example, the same event data item may be processed by two or more event processing nodes without synchronizing, among the nodes, their respective real-time clocks or pseudo-clocks.

Figure 4:
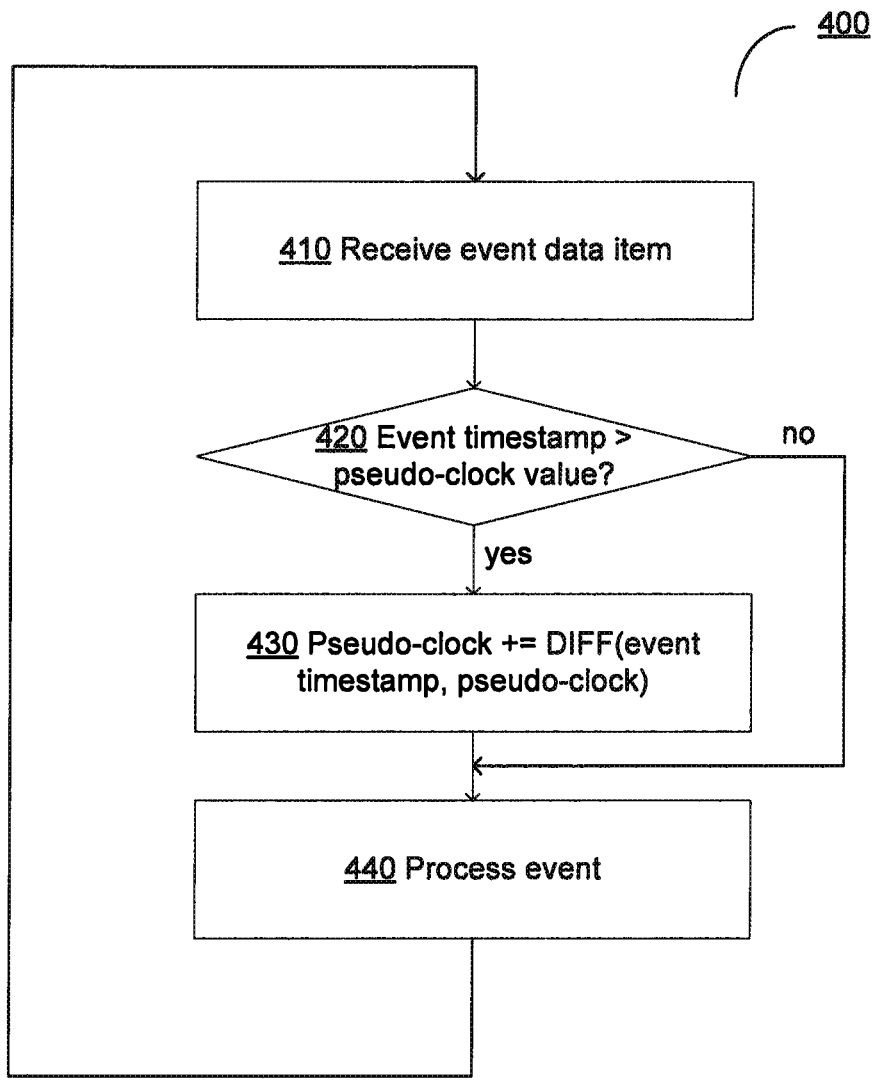
FIG. 4 depicts a flow diagram of a method for complex event processing using a pseudo-clock, in accordance with one or more aspects of the present disclosure.

FIG. 4 depicts a flow diagram of one illustrative example of a method 400 for complex event processing using a pseudo-clock, in accordance with one or more aspects of the present disclosure. Method 400 and/or each of its individual functions, routines, subroutines, or operations may be performed by one or more processing devices of the computer system (e.g., event processing nodes 110A-110Z of FIG. 1) implementing the method. In certain implementations, method 400 may be performed by a single processing thread. Alternatively, method 400 may be performed by two or more processing threads, each thread executing one or more individual functions, routines, subroutines, or operations of the method. In an illustrative example, the processing threads implementing method 400 may be synchronized (e.g., using semaphores, critical sections, and/or other thread synchronization mechanisms). Alternatively, the processing threads implementing method 400 may be executed asynchronously with respect to each other.

At block 410, a processing device of the event processing node implementing the method may receive an event data item from an event source. The event data item may reflect a change of the system state, and may comprise a unique event identifier, a timestamp, an one or more state variable values, as described in more details herein above.

Responsive to determining, at block 420, that the event timestamp differs from the value of the pseudo-clock associated with the event processing node, the processing may continue at block 430. Otherwise, the method may branch to block 440.

At block 430, the processing device may adjust the pseudo-clock by the difference between the event timestamp and the current value of the pseudo-clock, thus synchronizing its state with the state of other event processing nodes of the event processing system, as described in more details herein above.

At block 440, the processing device may process the incoming event data item. The processing may comprise evaluating one or more conditional statements associated with one or more event processing rules and executing one or more actions associated with the event processing rules, as described in more details herein above. Upon completing the operations schematically described by block 440, the method may loop back to block 410.

Figure 5:
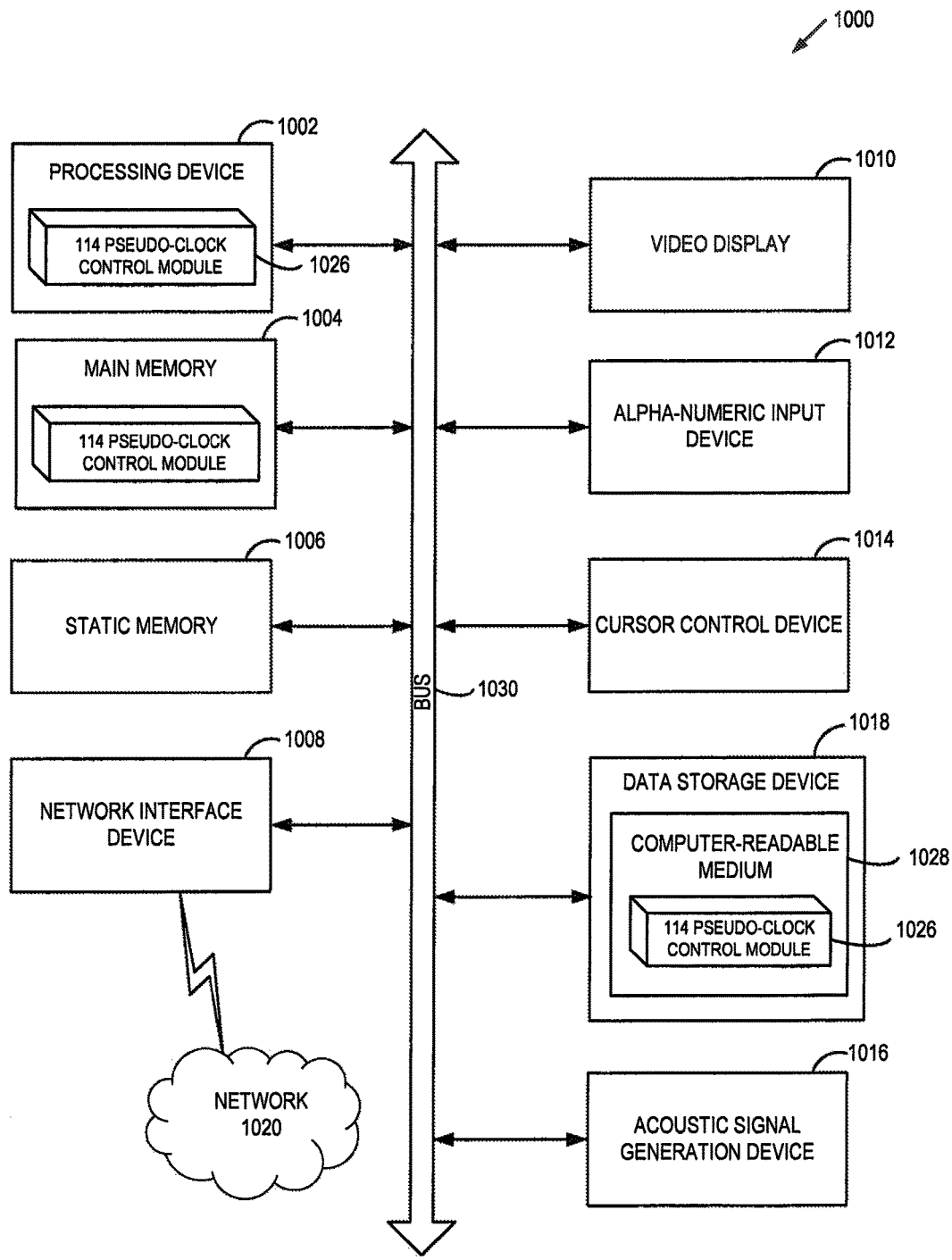
FIG. 5 depicts a block diagram of an illustrative computer system operating in accordance with examples of the invention.

FIG. 5 schematically illustrates a component diagram of an example event processing system 1000 which can perform any one or more of the methods described herein. In various illustrative examples, event processing system 1000 may represent event processing nodes 110 of FIG. 1.

Example event processing system 1000 may be connected to other computer systems in a LAN, an intranet, an extranet, and/or the Internet. Event processing system 1000 may operate in the capacity of a server in a client-server network environment. Event processing system 1000 may be a personal computer (PC), a set-top box (STB), a server, a network router, switch or bridge, or any device capable of executing a set of instructions (sequential or otherwise) that specify actions to be taken by that device. Further, while only a single example computer system is illustrated, the term "computer" shall also be taken to include any collection of computers that individually or jointly execute a set (or multiple sets) of instructions to perform any one or more of the methods discussed herein.

Example event processing system 1000 may comprise a processing device 1002 (also referred to as a processor or CPU), a main memory 1004 (e.g., read-only memory (ROM), flash memory, dynamic random access memory (DRAM) such as synchronous DRAM (SDRAM), etc.), a static memory 1006 (e.g., flash memory, static random access memory (SRAM), etc.), and a secondary memory (e.g., a data storage device 1018), which may communicate with each other via a bus 1030.

"Processor" or "processing device" herein refers to a device capable of executing instructions encoding arithmetic, logical, or I/O operations. In one illustrative example, a processor may follow Von Neumann architectural model and may include an arithmetic logic unit (ALU), a control unit, and a plurality of registers. In a further aspect, a processor may be a single core processor which is typically capable of executing one instruction at a time (or process a single pipeline of instructions), or a multi-core processor which may simultaneously execute multiple instructions. In another aspect, a processor may be implemented as a single integrated circuit, two or more integrated circuits, or may be a component of a multi-chip module (e.g., in which individual microprocessor dies are included in a single integrated circuit package and hence share a single socket). A processor may also be referred to as a central processing unit (CPU).

Processing device 1002 represents one or more general-purpose processing devices such as a microprocessor, central processing unit, or the like. More particularly, processing device 1002 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. In accordance with one or more aspects of the present disclosure, processing device 1002 may be configured to execute pseudo-clock control module 114 implementing method 400 for complex event processing using a pseudo-clock.

"Memory device" herein refers to a volatile or non-volatile memory device, such as RAM, ROM, EEPROM, or any other device capable of storing data. "I/O device" herein refers to a device capable of providing an interface between a processor and an external device capable of inputting and/or outputting binary data. In an illustrative example, an I/O device may be provided by a network interface controller (NIC) or a block I/O device, such as a disk.

Example event processing system 1000 may further comprise a network interface device 1008, which may communicatively coupled to a network 1020. Example event processing system 1000 may further comprise a video display 1010 (e.g., a liquid crystal display (LCD), a touch screen, or a cathode ray tube (CRT)), an alphanumeric input device 1012 (e.g., a keyboard), a cursor control device 1014 (e.g., a mouse), and an acoustic signal generation device 1016 (e.g., a speaker).

Data storage device 1018 may include a computer-readable storage medium (or more specifically a non-transitory computer-readable storage medium) 1028 on which is stored one or more sets of executable instructions 1026. In accordance with one or more aspects of the present disclosure, executable instructions 1026 may comprise executable instructions encoding various functions of resource allocation component, including method 400 for complex event processing using a pseudo-clock.

Executable instructions 1026 may also reside, completely or at least partially, within main memory 1004 and/or within processing device 1002 during execution thereof by example event processing system 1000, main memory 1004 and processing device 1002 also constituting computer-readable storage media. Executable instructions 1026 may further be transmitted or received over a network via network interface device 1008.

While computer-readable storage medium 1028 is shown in FIG. 5 as a single medium, the term "computer-readable storage medium" should be taken to include a single medium or multiple media (e.g., a centralized or distributed database, and/or associated caches and servers) that store the one or more sets of VM operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus may be specially constructed for the required purposes, or it may be a general purpose computer system selectively programmed by a computer program stored in the computer system. Such a computer program may be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus.

Various general purpose systems may be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages may be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but may be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

What is claimed is:

1. A method, comprising:
   receiving, by a first processing device of a first event processing node from a data source, an event data item indicating a change of a system state, the event data item comprising a unique event identifier, a timestamp from the data source, and a value of a state variable associated with the system state;
   responsive to determining a first difference between the timestamp and a first value of a first pseudo-clock of the first event processing node, adjusting, by the first processing device, the first value of the first pseudo-clock by the first difference;
   receiving, by a second processing device of a second event processing node, the event data item from the data source, wherein the data source is different from the first event processing node and from the second event processing node;
   responsive to determining a second difference between the timestamp and a second value of a second pseudo-clock of the second event processing node, synchronizing a second state of the second event processing node with a first state of the first event processing node by adjusting, by the second processing device, the second value of the second pseudo-clock by the second difference, wherein the first difference is unequal to the second difference;
   applying, by the first processing device, an event processing rule to values of the event data item to produce an event processing command comprising a command identifier derived from a first identifier of the event processing rule and the unique event identifier of the event data item; and
   executing, by the first processing device, the event processing command to perform an action, wherein the action is associated with the command identifier and generates one or more parameters to be passed to a software module of the first event processing node.

2. The method of claim 1, further comprising evaluating a conditional statement associated with the event processing rule, wherein the conditional statement comprises the value of the state variable.

3. The method of claim 2, further comprising, responsive to evaluating the conditional statement, executing the action associated with the command identifier.

4. The method of claim 1, further comprising issuing the event processing command to an external command processing system.

5. The method of claim 1, wherein the command identifier comprises a third identifier of the software module and a value of a parameter, of the one or more parameters, to be passed to the software module.

6. A system comprising:
   a first memory; and
   a first processing device of a first event processing node, the first processing device operatively coupled to the first memory, the first processing device to:
     receive an event data item indicating a change of a system state, the event data item comprising a unique event identifier, a timestamp from a data source, and a value of a state variable associated with the system state; and
     responsive to determination of a first difference between the timestamp and a first value of a first pseudo-clock of the first event processing node, adjust the first value of the first pseudo-clock by the first difference;
   a second memory; and
   a second processing device of a second event processing node geographically separated from the first event processing node, the second event processing node operatively coupled to the second memory, the second processing device to:
     receive the event data item from the data source, wherein the data source is different from the first event processing node and from the second event processing node;
     responsive to determination of a second difference between the timestamp and a second value of a second pseudo-clock of the second event processing node, synchronize a second state of the second event processing node with a first state of the first event processing node by adjusting the second value of the second pseudo-clock by the second difference, wherein the first difference is unequal to the second difference; and
   wherein the first processing device is further to:
     apply an event processing rule to values of the event data item to produce an event processing command comprising a command identifier derived from a first identifier of the event processing rule and the unique event identifier of the event data item; and
     execute the event processing command to perform an action, wherein the action is associated with the command identifier and is to generate one or more parameters to be passed to a software module of the first event processing node.

7. The system of claim 6, wherein the first processing device is further to evaluate a conditional statement associated with the event processing rule, wherein the conditional statement comprises the value of the state variable.

8. The system of claim 7, wherein the first processing device is further to, responsive to evaluating the conditional statement, execute the action associated with the command identifier.

9. The system of claim 6, wherein the event processing command is further to issue the event processing command to an external command processing system.

10. The system of claim 6, wherein the command identifier is to identify the software module and a value of a parameter, of the one or more parameters, to be passed to the software module.

11. A computer-readable non-transitory storage medium comprising executable instructions that, when executed by a processing device of a first event processing node, cause the processing device to:

receive, by the processing device from a data source, an event data item indicating a change of a system state, the event data item comprising a unique event identifier, a timestamp from the data source, and a value of a state variable associated with the system state;

responsive to determining a first difference between the timestamp and a first value of a first pseudo-clock of the first event processing node, adjust the value of the first pseudo-clock by the first difference;

receive, by a second event processing node, the event data item from the data source, wherein the data source is different from the first event processing node and from the second event processing node;

responsive to determining a second difference between the timestamp and a second value of a second pseudo-clock of the second event processing node, synchronize a second state of the second event processing node with a first state of the first event processing node by adjusting, by the processing device, the second value of the second pseudo-clock by the second difference, wherein the first difference is unequal to the second difference; and apply, by the second event processing node, an event processing rule to values of the event data item to produce an event processing command comprising a command identifier derived from a first identifier of the event processing rule and the unique event identifier of the event data item; and execute, by the second event processing node, the event processing command to perform an action, wherein the action is associated with the command identifier and is to generate one or more parameters to be passed to a software module of the second event processing node.

12. The computer-readable non-transitory storage medium of claim 11, further comprising executable instructions causing the processing device to evaluate a conditional statement associated with the event processing rule, wherein the conditional statement comprises the value of the state variable.

13. The computer-readable non-transitory storage medium of claim 12, further comprising executable instructions causing the processing device to execute the action associated with the command identifier and in response to evaluation of the conditional statement.

* * * * *